United States Patent
McCoy

(10) Patent No.: US 7,531,980 B2
(45) Date of Patent: May 12, 2009

(54) AIRCRAFT CABIN PRESSURE CONTROLS: DUTY CYCLE OFFSET TO COMPENSATE FOR ASYMMETRIC MOTOR LOADING IN AN OPEN-LOOP MOTOR CONTROL SYSTEM

(75) Inventor: Gerard L. McCoy, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 271 days.

(21) Appl. No.: 11/681,569

(22) Filed: Mar. 2, 2007

(65) Prior Publication Data

US 2008/0211445 A1 Sep. 4, 2008

(51) Int. Cl.
*G05B 11/36* (2006.01)

(52) U.S. Cl. .............. 318/609; 318/610; 137/81.1; 417/44.2

(58) Field of Classification Search ............... 318/609, 318/610; 137/81.1; 417/44.2
See application file for complete search history.

(56) References Cited

U.S. PATENT DOCUMENTS

| | | | |
|---|---|---|---|
| 4,527,953 A * | 7/1985 | Baker et al. ............. | 417/38 |
| 4,694,390 A | 9/1987 | Lee | |
| 5,075,608 A * | 12/1991 | Erdman et al. ............. | 318/599 |
| 5,297,987 A | 3/1994 | Emmons et al. | |
| RE35,124 E * | 12/1995 | Erdman et al. ............. | 318/599 |
| 5,543,696 A | 8/1996 | Huggett et al. | |
| 6,761,628 B2 | 7/2004 | Horner | |
| 6,962,324 B2 | 11/2005 | Bunn et al. | |
| 6,979,257 B2 | 12/2005 | Horner et al. | |
| 7,101,277 B2 | 9/2006 | Horner et al. | |
| 2005/0153648 A1 | 7/2005 | Horner | |
| 2006/0211359 A1* | 9/2006 | Arthurs et al. ............. | 454/74 |
| 2007/0017573 A1* | 1/2007 | Frampton ............. | 137/81.1 |
| 2007/0020108 A1* | 1/2007 | Walls ............. | 417/44.2 |
| 2007/0049188 A1 | 3/2007 | McCoy | |

OTHER PUBLICATIONS

European Search Report dated Nov. 11, 2008.

* cited by examiner

*Primary Examiner*—Bentsu Ro
*Assistant Examiner*—David S Luo
(74) *Attorney, Agent, or Firm*—Oral Caglar, Esq.

(57) ABSTRACT

A cabin pressure control system (CPCS) software control logic modification may boost the voltage applied to a motor by applying a duty cycle offset to compensate for asymmetric motor loading. The motor may be part of an open-loop system for operating a butterfly valve that may regulate outflow from the aircraft cabin. In CPCS applications, the loading on the butterfly valve is unidirectional due to a mechanical spring and pneumatic loading, thus, causing asymmetric loading to the motor. By boosting the motor voltage when the motor is required to act against the asymmetric load, CPCS performance and robustness may be improved.

20 Claims, 6 Drawing Sheets

AIRCRAFT CABIN PRESSURE CONTROLS: DUTY CYCLE OFFSET TO COMPENSATE FOR ASYMMETRIC MOTOR LOADING IN AN OPEN-LOOP MOTOR CONTROL SYSTEM

BACKGROUND OF THE INVENTION

The present invention generally relates to an aircraft cabin pressure control system and method and, more specifically, to systems and methods for controlling aircraft cabin pressure with an open-loop motor control system by applying a duty cycle offset to compensate for asymmetric motor loading.

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes. The altitude to which an aircraft may fly is, in many instances, limited to a maximum certified altitude.

As the altitude of an aircraft increases, from its take-off altitude to its "top of climb" or "cruise" altitude, the ambient atmospheric pressure outside of the aircraft decreases. Thus, unless otherwise controlled, air could leak out of the aircraft cabin causing it to decompress to an undesirably low pressure at high altitudes. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin pressure altitude," which refers to the normal atmospheric pressure existing at a certain altitude. Studies have shown that the symptoms of hypoxia may become noticeable when the cabin pressure altitude is above the equivalent of the atmospheric pressure one would experience outside at 8,000 feet. Thus, many aircraft are equipped with a cabin pressure control system (CPCS) which functions to, among other things, maintain the cabin pressure altitude to within a relatively comfortable range (e.g., at or below approximately 8,000 feet), allow gradual changes in the cabin pressure altitude to minimize passenger discomfort and maintain cabin-to-atmosphere differential pressure below nominal and maximum limits. Thus, many cabin pressure control systems control cabin altitude as a function of aircraft altitude, and do so in a manner and rate that will keep the cabin-to-atmosphere differential pressure less than the nominal limit.

Conventional cabin pressure control systems are designed to exhaust cabin air during flight in order to comfortably and safely pressurize the fuselage (cabin) so that high altitude aircraft flight can occur. Conventional CPCS design may utilize an electromechanically controlled outflow valve that is modulated to control the outflow of air from the cabin, thereby controlling cabin pressure. The electromechanically controlled outflow valve is comprised of an embedded software controller that spins a motor which drives a geartrain connected to a butterfly valve. In conventional CPCS designs, a brushed motor is spun in an open-loop drive scheme, that is, by applying a voltage directly across the motor terminals, without using speed feedback as a control parameter.

An open-loop drive scheme may lead to asymmetric motor response if the loading on the motor shaft is asymmetric, that is, the loading to the motor is only in one direction. In CPCS applications, the loading on the geartrain connected to the butterfly valve is unidirectional (in the closing direction) due to a mechanical spring and pneumatic effects, thus causing asymmetric loading on the motor. Asymmetric motor loading can cause undesirable CPCS response in an open-loop motor drive scheme, that is, without using motor speed feedback information to correct for the asymmetric loading. The undesirable CPCS response can be a source of dissatisfaction with aircraft operators.

Referring to FIG. 1, there is shown a control law logic 10 for a conventional CPCS according to the prior art. The input variable is the cabin rate error 12, which is the cabin rate command (not shown) minus the cabin rate actual (not shown). Generally, the term "cabin rate" refers to the change in cabin altitude relative to sea level, often expressed in sea level feet per minute (slfpm). The cabin rate command refers to a commanded rate of change in cabin altitude. Often, it is desirable to have a relatively small cabin rate command so that passengers in the aircraft cabin may not notice sudden changes in cabin pressure that may be associated with sudden changes in cabin altitude.

The cabin rate error 12 may be operated upon by a proportional-integral (PI) control scheme 14 as is known in the art. The output from the PI control scheme 14 may be a duty cycle command (proportional) 16 and a duty cycle command (integral) 18. The proportional duty cycle command 16, as is known in the art, may be summed with the integral duty cycle command 18 to provide an unlimited duty cycle command 20. The unlimited duty cycle command 20 may be controlled within preset saturation limits 22 to give a duty cycle command 24. This duty cycle command 24 may correspond to a certain voltage being applied directly to a motor to regulate a butterfly valve (not shown), as discussed above, in an open-loop system. However, as discussed above, depending on the pneumatic and mechanical loading in the system, the conventional duty cycle command 24 may be insufficient for proper regulation of the cabin altitude and cabin rate, thereby creating dissatisfaction with aircraft operators and passengers.

As can be seen, there is a need for an open-loop control logic and method that may compensate for asymmetric motor loading while appropriately regulating cabin air pressure.

SUMMARY OF THE INVENTION

In one aspect of the present invention, a control logic for a cabin pressure control system, the control logic comprises a proportional/integral (PI) control scheme for providing an unlimited duty cycle command; a duty cycle offset that is summed with the unlimited duty cycle command to provide an offset unlimited duty cycle command; and a switch, the switch providing a duty cycle command as the unlimited duty cycle command when the unlimited duty cycle command is <0, and the switch providing a duty cycle command as the offset unlimited duty cycle command when the unlimited duty cycle command is >=0, wherein the duty cycle command corresponds to a voltage delivered to a motor.

In another aspect of the present invention, a method for regulating the voltage delivered to a motor comprises determining an unlimited duty cycle command from a proportional/integral (PI) control scheme; summing a duty cycle offset with the unlimited duty cycle command to provide an offset unlimited duty cycle command; providing a duty cycle command as the unlimited duty cycle command when the unlimited duty cycle command is <0; providing a duty cycle command as the offset unlimited duty cycle command when the unlimited duty cycle command is >=0; and delivering voltage to a motor based on the duty cycle command.

In a further aspect of the present invention, a method for regulating the air pressure in an aircraft cabin comprises determining an unlimited duty cycle command from a proportional/integral (PI) control scheme; summing a duty cycle offset with the unlimited duty cycle command to provide an offset unlimited duty cycle command; providing a duty cycle command as the unlimited duty cycle command when the unlimited duty cycle command is <0; providing a duty cycle command as the offset unlimited duty cycle command when the unlimited duty cycle command is >=0; delivering voltage to a motor based on the duty cycle command; and spinning the motor to position an outflow valve at a position to regulate the air pressure in the aircraft cabin.

These and other features, aspects and advantages of the present invention will become better understood with reference to the following drawings, description and claims.

DETAILED DESCRIPTION OF THE INVENTION

Figure 1:
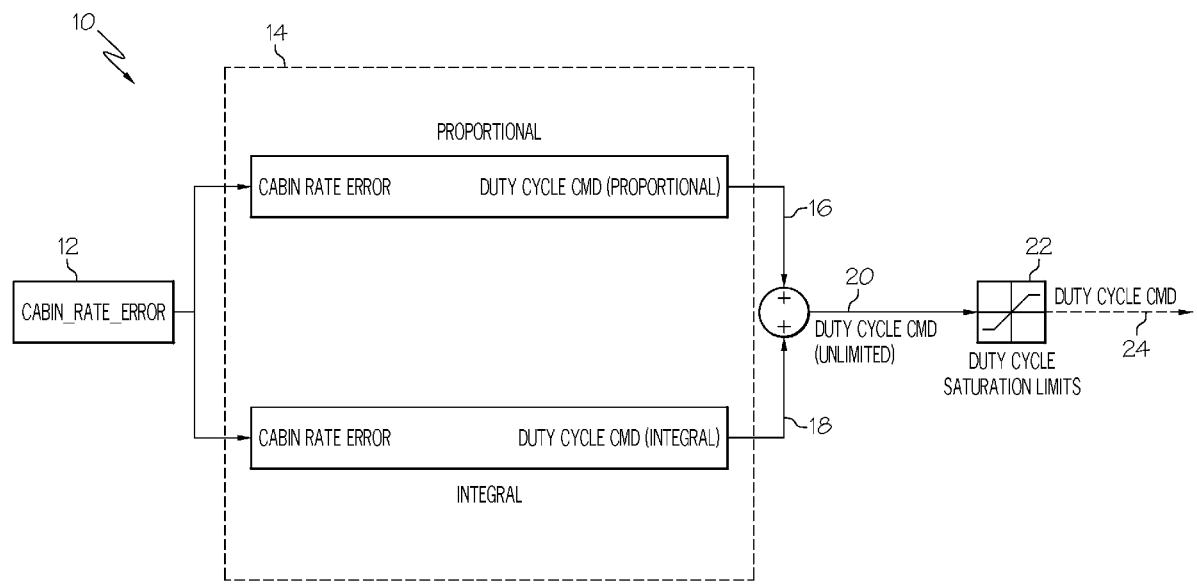
FIG. 1 is a block diagram showing a control law logic according to the prior art.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, and without limiting the present invention, the present invention provides a CPCS software control logic modification which may boost the voltage applied to a motor that may experience asymmetric motor loading. The motor may be part of an open-loop system for operating a butterfly valve that may regulate outflow from the aircraft cabin to ambient pressure outside the aircraft cabin. Larger than normal cabin pressure and cabin rate error conditions may be an indication that the outflow valve is not responding in a normal manner, potentially caused by asymmetric motor loading and response. By boosting the motor voltage when the motor is driving against the direction of the applied load, CPCS performance and robustness may be improved. The apparatus and method of the present invention may compensate for load variation that can occur with different CPCS butterfly valve sizes by optimizing the duty cycle offset value for each valve size. The present invention may allow CPCS applications with large butterfly valves, whereas, without the software modifications of the present invention, the asymmetric loading, especially with large butterfly valves, may be prohibitively large and acceptable CPCS control may not be possible.

Conventional CPCS design, as discussed above, which may have limited integrator duty cycle limits and the integrator gains, may result in, at best, a slow response to any larger than normal cabin pressure and cabin rate error conditions that may occur. The present invention, by providing a duty cycle offset, the values of which may be based on, for example, the angle of the butterfly valve and the flow through the butterfly valve, may allow an applied voltage to the motor (in this case, the motor refers to the motor that controls the opening/closing of the butterfly valve) to exceed the limits set forth in the CPCS design of the prior art. The apparatus and methods of the present invention may allow for prompt and effective response to cabin pressure and cabin rate error conditions. Moreover, the design of the present invention, as discussed in more detail below, may keep the integrator duty cycle close to zero, thereby retaining the full range of the integrator duty cycle for further motor control.

Various non-linearities in a CPCS system can potentially compromise the ability to achieve smooth cabin pressurization control. One of these non-linearities is motor loading referred through the actuator from the loading applied to the butterfly plate in a butterfly valve which may control outflow from an enclosed space, such as an aircraft cabin. The motor loading may be of pneumatic origin caused by load torque on the butterfly plate due to valve flow, valve angle and differential pressure between, for example, the aircraft cabin and the ambient pressure. The motor loading may also be of mechanical origin caused by load torque from a closing spring mechanism. The pneumatic and mechanical loadings are asymmetric to the motor, that is, they are primarily in the valve's closing direction, potentially causing asymmetric motor response (the response being faster when commanding the motor in the same direction as the closing torque versus when commanding the motor to operate against the closing torque) in an open-loop system without closed-loop motor speed control.

Figure 2:
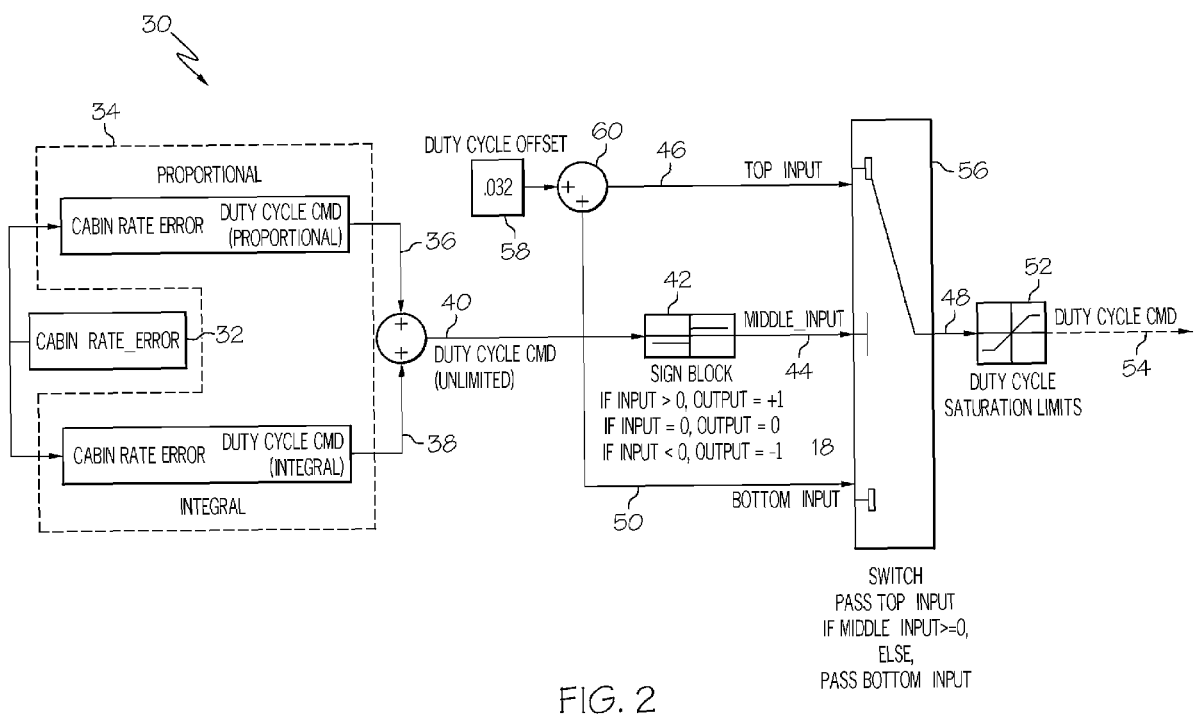
FIG. 2 is a block diagram showing a control law logic according to an embodiment of the present invention.

Referring to FIG. 2, there is shown a block diagram showing a control logic 30 according to the present invention. The input variable may be the cabin rate error 32, which is the cabin rate command (which is, for example, the cabin rate as determined by the aircraft operator) minus the cabin rate actual (which is, for example, the cabin rate actually measured in an aircraft cabin). Similar to the conventional system as shown in FIG. 1, the cabin rate error 32 may be mathematically operated upon by a proportional-integral (PI) control scheme 34. The output from the PI control scheme 34 may be a duty cycle command (proportional) 36 and a duty cycle command (integral) 38. The proportional duty cycle command 36, as is known in the art, may be summed with the integral duty cycle command 38 to provide an unlimited duty cycle command 40. The proportional and integral duty cycle commands 36, 38, as well as the unlimited duty cycle command 40 may be, for example, analog signals representing values to determine the voltage applied to a motor, as is further discussed greater detail below.

The direction of the unlimited duty cycle command 40 may be determined by using a "sign block" 42. The sign convention of the present invention may be such that if the motor is driving against the direction of the load (wherein the load is in the closing direction of the butterfly valve, as discussed above), the unlimited duty cycle command is >=0 and a positive sign occurs (+1). This positive sign may be fed into a middle input 44 of a switch 56. If the load on the motor is driving with the direction of the load, the unlimited duty cycle command is <0 and a negative sign occurs (−1). This negative sign may be fed into the middle input 44 of the switch 56.

If the middle input 44 of the switch 56 is positive, then a top input 46 of the switch 56 may be allowed to pass as an unlimited duty cycle offset command 48. If the middle input 44 of the switch 56 is negative, then a bottom input 50 of the switch 56 may be allowed to pass as the unlimited duty cycle offset command 48.

When the bottom input 50 of the switch 56 is output as the unlimited duty cycle offset command 48, this value may be the same as the unlimited duty cycle command 40. In other words, there is no change or boost in the unlimited duty cycle command 40 when the motor is being driven in the same direction of the load. The unlimited duty cycle offset command 48 may be controlled within preset saturation limits 52 to give a duty cycle command 54.

When the input to the sign block 42 is positive (+1), the unlimited duty cycle command 40 may be summed with a duty cycle offset 58, as shown by the summing block 60, to provide an offset unlimited duty cycle command 46. The offset unlimited duty cycle command 46 is the top input of the switch 56, which may be allowed to pass as the unlimited duty cycle offset command 48 when the unlimited duty cycle command 40 is positive (+1).

While FIG. 2 used a sign block 42 to input a positive (+1) signal or a negative (−1) signal to the middle input 44 of the switch 56, the unlimited duty cycle command 40 may be directly inputted into the middle input 44. In this case, if the unlimited duty cycle command 40 is >=0, then the top input 46 may be allowed to pass through the switch 56. If the unlimited duty cycle command 40 is <0, then the bottom input 50 may be allowed to pass through the switch 56.

The unlimited duty cycle offset command 48 may be controlled within preset saturation limits 52 to give a duty cycle command 54. This duty cycle command 54 may correspond, as shown in the example below, to a certain voltage being applied directly to a motor to regulate a butterfly valve (not shown), as discussed above, in an open-loop system. The motor driven butterfly valve in an open-loop system may be similar to that described in U.S. Pat. No. 6,979,257, herein incorporated in its entirety by reference.

While FIG. 2 shows the duty cycle offset 58 as, for example, 0.032, this value may vary across applications. In one embodiment of the present invention, the duty cycle offset 58 may vary from about 0.020 to about 0.050. For example, in applications wherein a large butterfly valve may be beneficial, a larger duty cycle offset 58 may be appropriate to control the integral duty cycle command 38, as discussed in more detail below with reference to FIG. 5.

Figure 3:
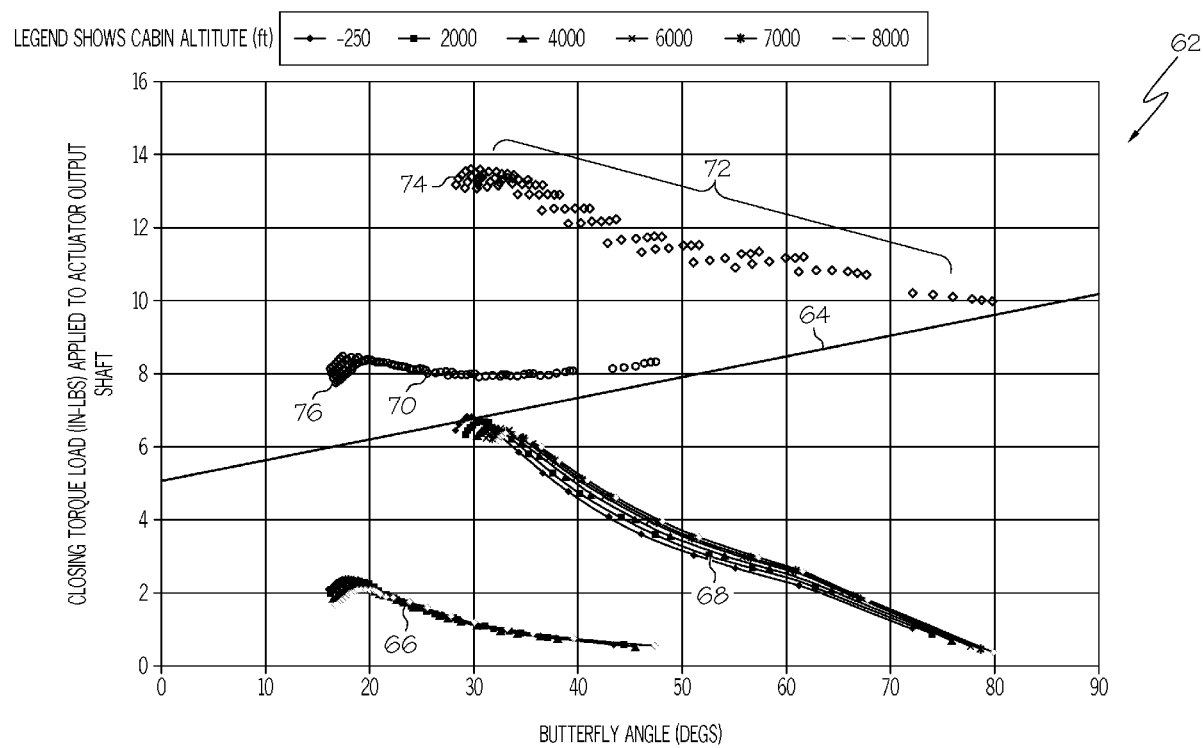
FIG. 3 is a graph showing the closing torque applied to an actuator output shaft versus the angle of the butterfly valve according to one embodiment for estimating the duty cycle offset according to the present invention.

Referring now to FIG. 3, there is shown a graph 62 of the closing torque applied to an actuator output shaft versus the angle of the butterfly valve according to one embodiment for estimating the duty cycle offset 58 according to the present invention. To estimate the duty cycle offset 58 required for a certain application, measurements may be taken to determine the closing torque load (in-lbs) at various cabin altitudes that may be applied to the output shaft of an actuator of a butterfly valve controlling air outflow from an aircraft cabin.

In the graph of FIG. 3, the closing spring torque curve 64 may be substantially linear, increasing with increased butterfly angle. (Butterfly angle refers to the angle in which the butterfly valve is open. A fully open butterfly valve may have a butterfly angle of 90 degrees.) Unlike pneumatic torque, which is discussed below, the closing spring torque curve 64 does not vary with varying cabin altitudes.

The pneumatic torque is measured at a minimum inflow curve 66 and at a maximum inflow curve 68. The minimum and maximum inflows refer to the air inflow provided into the cabin of an aircraft, for example, by the aircraft's environmental control system (ECS). As would be expected, the pneumatic torque curves 66, 68 may vary with varying butterfly angles.

The pneumatic torque at minimum inflow curve 66 may be added with the closing spring torque curve 64 to give minimum closing torque load curve 70. In the present example, the minimum point 76 of the closing torque load curve 70 is about 8 in-lbs. The pneumatic torque at maximum inflow curve 68 may be added with the closing spring torque curve 64 to give the maximum closing torque load curve 72. In the present example, the peak 74 of the maximum closing torque load curve 72 is about 14 in-lbs. Therefore, in this example, torque loading to the actuator output shaft may be expected to be between 8 and 14 in-lbs.

Figure 4:
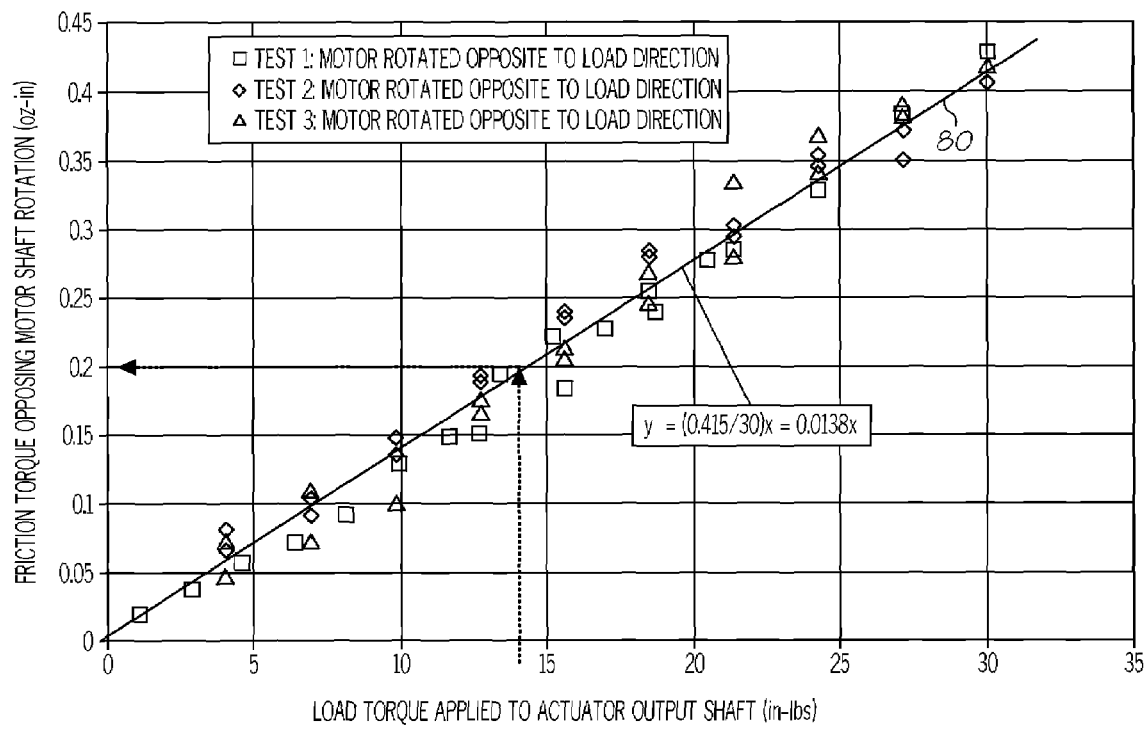
FIG. 4 is a graph showing a friction torque opposing motor shaft rotation versus the load torque determined in FIG. 3 according to one embodiment for estimating the duty cycle offset according to the present invention.

Referring to FIG. 4, there is shown a graph 78 of a friction torque opposing motor shaft rotation versus the load torque determined in FIG. 3 according to one embodiment for estimating the duty cycle offset 58 according to the present invention. Three tests were conducted to create a substantially linear curve 80 which may be used to convert the load torque determined from FIG. 3 into friction torque opposing motor shaft rotation (oz-in) by using the empirical relationship between motor friction torque and actuator load. In the present example, a 14 in-lb actuator load may be converted to an equivalent friction torque opposing motor rotation of about 0.2 oz-in. While, in this example, the maximum load torque from FIG. 3 was used, a different value, such as an average load torque may be used in the conversion that takes place with reference to FIG. 4. By using a value of the load torque that is lower than the maximum load torque, a smoother cabin rate may be observed while still preventing an undesirable CPCS response due to the asymmetric motor load.

Once the friction torque opposing motor rotation is determined, this value may be converted to a duty cycle offset by using the procedure described below.

Assuming a motor torque constant ($K_T$) of 3.68 oz-in/amp and a motor terminal resistance (R) of 14.4 ohm in this example, the effective motor current offset that would theoretically be required to offset 0.2 oz-in friction torque is (from the formula $\tau = KTI$, wherein $\tau$ is the friction torque):

$$\text{Effective motor current offset} = \frac{0.2 \text{ oz-in}}{3.68 \text{ oz-in}/amp} = 0.054 \, amps.$$

The effective motor terminal voltage offset, V, to generate 0.054 amps in the motor winding is (from the formula V=IR)

Effective motor voltage offset=0.054 amps*14.4 ohm=0.78 volts (V).

Assuming the nominal motor voltage in this example is 24 volts, the effective duty cycle offset is Effective duty cycle offset=0.78 volts/24 volts=0.032 (3.2%).

Figure 5:
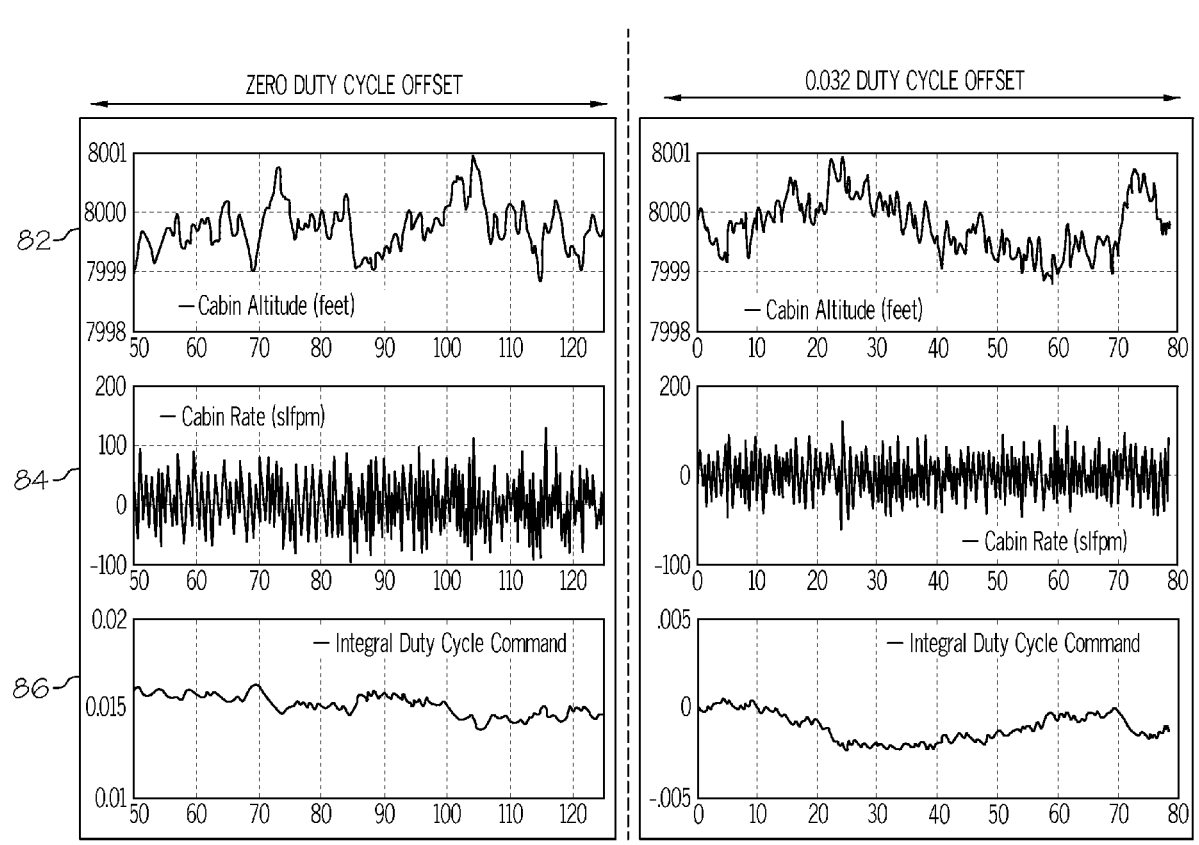
FIG. 5 is a series of graphs showing a simulation of CPCS performance, comparing conventional CPCS design with that of the present invention.

Referring now to FIG. 5, there are shown a series of graphs depicting a simulation of CPCS performance, comparing conventional CPCS design with that of the present invention, utilizing an effective duty cycle offset of 0.032.

A first graph 82 shows the cabin altitude performance prediction with zero duty cycle offset and with a 0.032 duty cycle offset. A second graph 84 shows the cabin rate performance prediction with a zero duty cycle offset and with a 0.032 duty cycle offset. As can be seen, cabin altitude and rate controllability may not be noticeably improved when the duty cycle offset of the present invention is included.

However, a third graph 86 shows the integral duty cycle command performance prediction with zero duty cycle offset and with a 0.032 duty cycle offset. In this case, the integral duty cycle command with zero duty cycle offset averages about 0.015. On the other hand, the integral duty cycle command with a 0.032 duty cycle offset results in an integral duty cycle command average of about zero.

As is known in the art, the integral duty cycle command may be used to increase the voltage applied to a motor in an open-loop system when, for example, the motor may experience a sudden load thereupon. Conventional integral duty cycle commands, however, have predetermined saturation limits, thereby creating a maximum integral duty cycle command. In some applications, for example, the integral duty cycle command may have saturation limits of +/−0.015. If that were the case in the example of FIG. 5, when there is zero duty cycle offset, there is no additional increase available in the integral duty cycle command. Therefore, in that situation, additional load on the motor may result in a potentially inadequate CPCS response.

Figure 6:
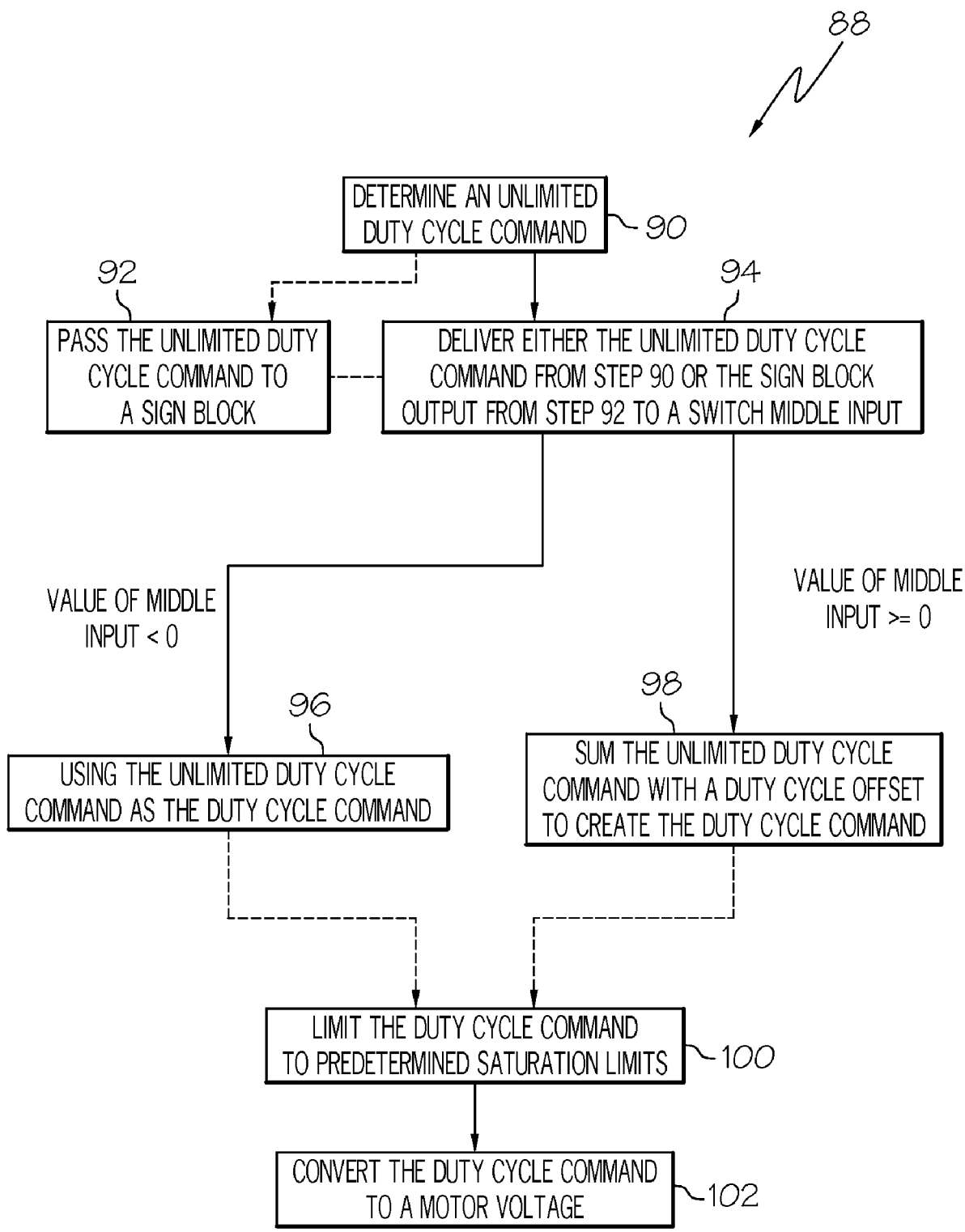
FIG. 6 is a flow chart describing a method according to one embodiment of the present invention.

Referring to FIG. 6, there is shown a flow chart describing a method 88 for regulating the pressure in an aircraft cabin according to one embodiment of the present invention. A first step 90 may include determining an unlimited duty cycle command (e.g., unlimited duty cycle command 40) from a PI control scheme (e.g., PI control scheme 34). The PI control scheme may be a conventional PI control scheme for providing an unlimited duty cycle command from a cabin rate error. The unlimited duty cycle command may optionally be passed into a sign block (e.g., sign block 42) at a step 92. The output of the sign block, when step 92 is performed, or the unlimited duty cycle command itself, when step 92 is omitted, may be delivered to the middle input of a switch (e.g., switch 56) at a step 94. If the value at the middle input of the switch is <0, then the unlimited duty cycle command may be used as the duty cycle command in a step 96, subject to a step 100 of maintaining the duty cycle command to predetermined saturation limits.

If the value at the middle input of the switch is >=0, then the unlimited duty cycle command may be summed with a duty cycle offset (e.g., duty cycle offset 58) at a step 98. The resulting sum may pass through the switch and be used as the duty cycle command in a step 98, subject to a step 100 of maintaining the duty cycle command to predetermined saturation limits.

Finally, a step 102 may deliver a voltage to a motor based on the duty cycle command. The motor may control a butterfly valve which controls air outflow from, for example, a cabin of an aircraft.

While the present invention has been described referring to regulating the pressure in an aircraft cabin, the present invention may be useful for regulating the pressure in any airborne vehicle having an enclosed fuselage (cabin), including commercial and/or military jets, helicopters, and the like. Moreover, while the present invention has been described above referring to the use of a butterfly valve for controlling air outflow, any motor driven valve assembly may be used. For example, the motor-driven valves of U.S. Pat. No. 6,962,324, herein incorporated by reference, may be used to control cabin outflow with the control logic of the present invention.

It should be understood, of course, that the foregoing relates to exemplary embodiments of the invention and that modifications may be made without departing from the spirit and scope of the invention as set forth in the following claims.

I claim:

1. A control logic for a cabin pressure control system, the control logic comprising:

a proportional/integral (PI) control scheme for providing an unlimited duty cycle command;

a duty cycle offset that is summed with the unlimited duty cycle command to provide an offset unlimited duty cycle command; and a switch, the switch providing a duty cycle command as the unlimited duty cycle command when the unlimited duty cycle command is <0, and the switch providing a duty cycle command as the offset unlimited duty cycle command when the unlimited duty cycle command is >=0, wherein the duty cycle command corresponds to a voltage delivered to a motor.

2. The control logic according to claim 1, further comprising duty cycle saturation limits, the duty cycle saturation limits delimiting a maximum duty cycle command output from the control logic.

3. The control logic according to claim 1, further comprising a sign block, the sign block receiving input from the unlimited duty cycle command and providing output to the switch.

4. The control logic according to claim 3, wherein the sign block outputs a positive signal when the unlimited duty cycle command is >=0, and the sign block outputs a negative signal when the unlimited duty cycle command is <0.

5. The control logic according to claim 4, wherein a positive signal provides a duty cycle command as the offset unlimited duty cycle command, and wherein a negative signal provides a duty cycle command as the unlimited duty cycle command.

6. The control logic according to claim 1, wherein the PI control scheme outputs a proportional duty cycle command and an integral duty cycle command, wherein a sum of the proportional duty cycle command and the integral duty cycle command provides the unlimited duty cycle command.

7. The control logic according to claim 1, wherein the unlimited duty cycle command is determined from the cabin rate error.

8. The control logic according to claim 1, wherein the duty cycle offset may be between about 0.020 and about 0.050.

9. A method for regulating the voltage delivered to a motor, the method comprising:

determining an unlimited duty cycle command from a proportional/integral (PI) control scheme;

summing a duty cycle offset with the unlimited duty cycle command to provide an offset unlimited duty cycle command;

providing a duty cycle command as the unlimited duty cycle command when the unlimited duty cycle command is <0;

providing a duty cycle command as the offset unlimited duty cycle command when the unlimited duty cycle command is >=0; and delivering voltage to a motor based on the duty cycle command.

10. The method according to claim 9, further comprising inputting a cabin rate error into the PI control scheme.

11. The method according to claim 9, wherein the duty cycle command is provided by a switch receiving the unlimited duty cycle command.

12. The method according to claim 9, further comprising inputting the unlimited duty cycle command into a sign block.

13. The method according to claim 12, further comprising:

outputting a positive signal from the sign block when the unlimited duty cycle command is >=0; and outputting a negative signal from the sign block when the unlimited duty cycle command is <0.

14. The method according to claim 13, further comprising delivering the output from the sign block to a switch, wherein the switch provides a duty cycle command as the unlimited duty cycle command when the unlimited duty cycle command is <0 and the switch provides a duty cycle command as the offset unlimited duty cycle command when the unlimited duty cycle command is >=0.

15. The method according to claim 9, further comprising limiting a maximum of the duty cycle command with predetermined duty cycle saturation limits.

16. A method for regulating the air pressure in an aircraft cabin, the method comprising:
- determining an unlimited duty cycle command from a proportional/integral (PI) control scheme;
- determining a duty cycle offset based upon an angle of an outflow valve, flow through the outflow valve and the force applied to the outflow valve by a closing spring mechanism;
- summing the duty cycle offset with the unlimited duty cycle command to provide an offset unlimited duty cycle command;
- providing a duty cycle command as the unlimited duty cycle command when the unlimited duty cycle command is <0;
- providing a duty cycle command as the offset unlimited duty cycle command when the unlimited duty cycle command is >=0;
- delivering voltage to a motor based on the duty cycle command; and
- spinning the motor to position the outflow valve at a position to regulate the air pressure in the aircraft cabin.

17. The method according to claim 16, wherein the duty cycle command is provided by a switch receiving the unlimited duty cycle command.

18. The method according to claim 16, further comprising:
- inputting the unlimited duty cycle command into a sign block;
- outputting a positive signal from the sign block when the unlimited duty cycle command is >=0;
- outputting a negative signal from the sign block when the unlimited duty cycle command is <0; and
- delivering the output from the sign block to a switch, wherein the switch provides a duty cycle command as the unlimited duty cycle command when the unlimited duty cycle command is <0 and the switch provides a duty cycle command as the offset unlimited duty cycle command when the unlimited duty cycle command is >=0.

19. The method according to claim 16, further comprising limiting a maximum of the duty cycle command with predetermined duty cycle saturation limits.

20. The method according to claim 16, wherein the outflow valve is a butterfly valve fluidly communicating the aircraft cabin with ambient pressure outside the aircraft.

* * * * *